May 15, 1945.  H. ANDERSON  2,376,304
BIN LEVEL CONTROL
Filed Aug. 7, 1943     3 Sheets-Sheet 1

INVENTOR:-
HELMER ANDERSON
BY Arthur R. Wylie
ATTY.

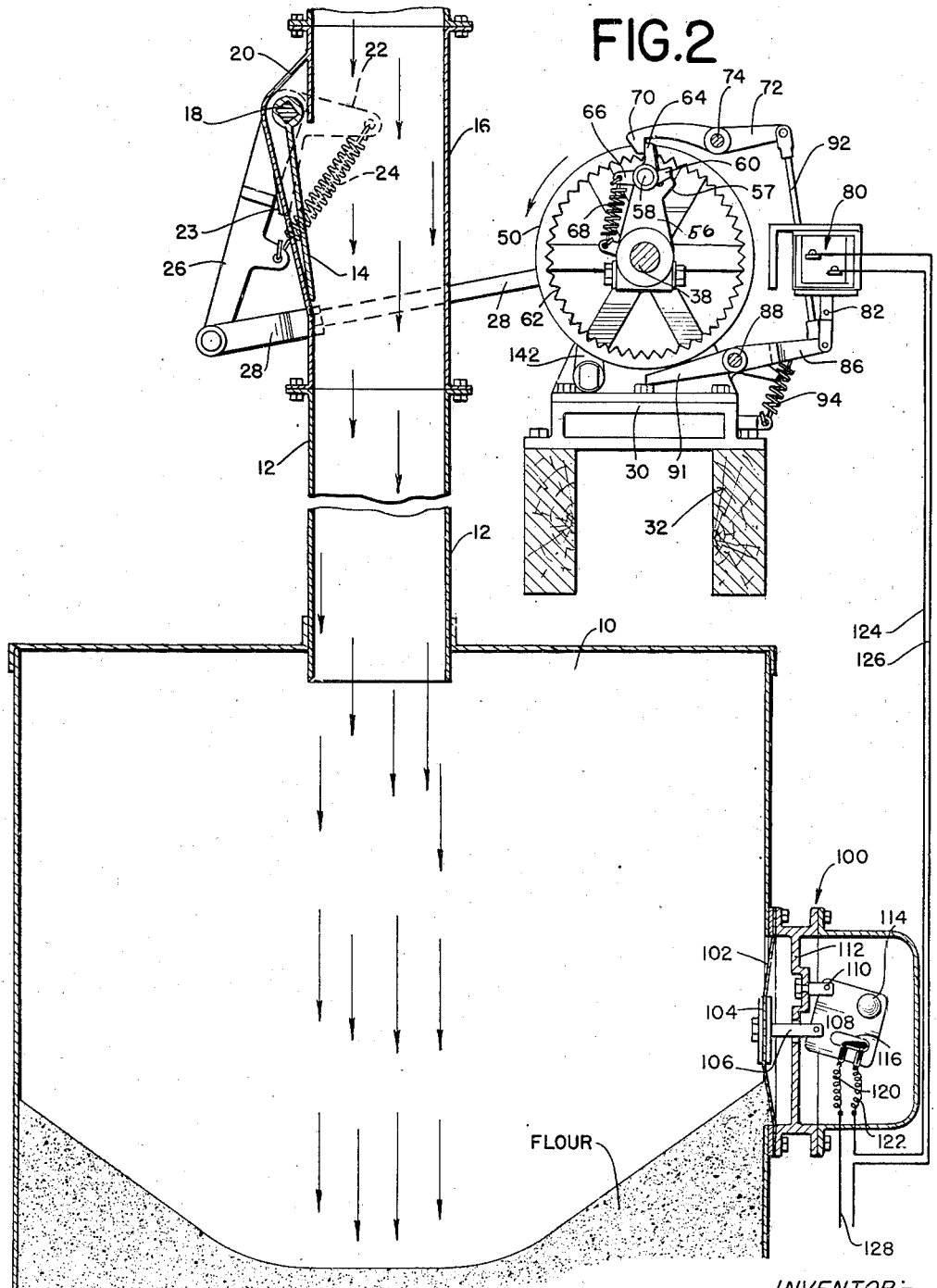

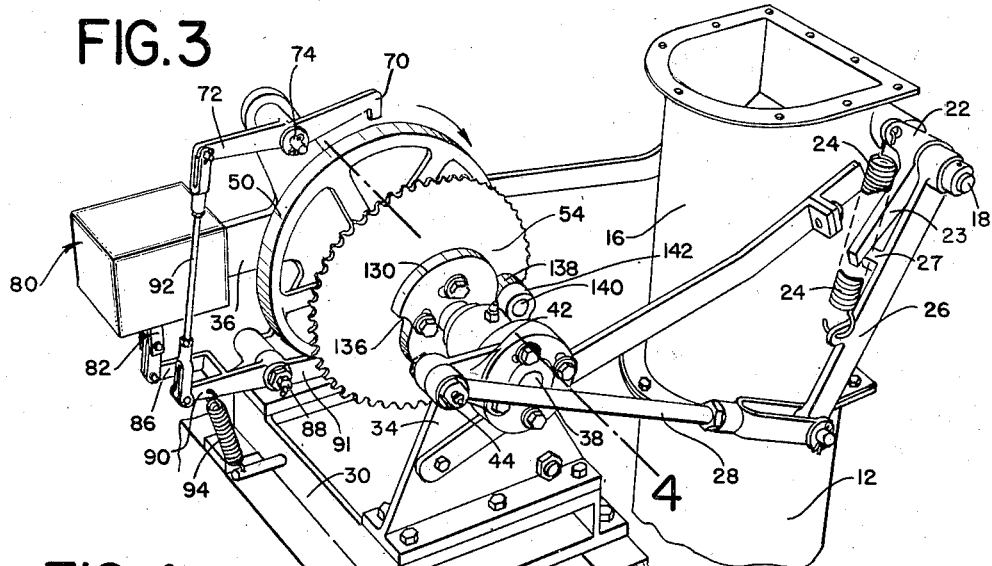
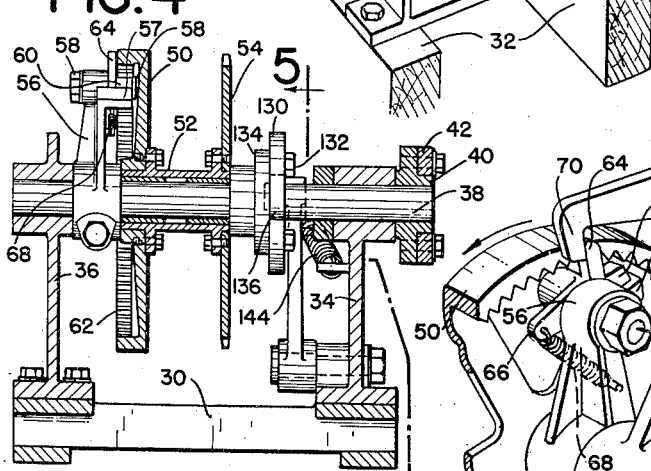
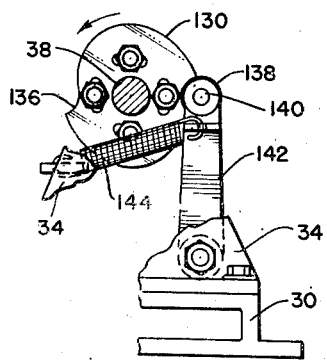
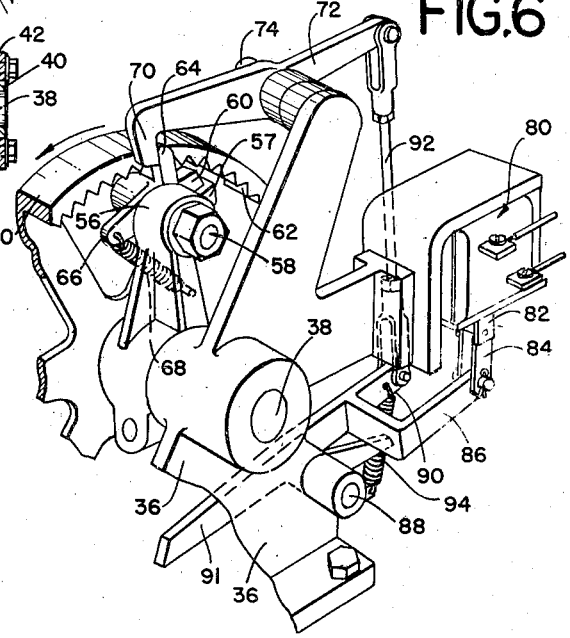
May 15, 1945.  H. ANDERSON  2,376,304
BIN LEVEL CONTROL
Filed Aug. 7, 1943  3 Sheets-Sheet 3
FIG. 3
FIG. 4
FIG. 5
FIG. 6
INVENTOR:-
HELMER ANDERSON
BY Arthur R. Bylie ATTY.

Patented May 15, 1945

2,376,304

UNITED STATES PATENT OFFICE 2,376,304

BIN LEVEL CONTROL

Helmer Anderson, Minneapolis, Minn., assignor to General Mills, Inc., a corporation of Delaware Application August 7, 1943, Serial No. 498,027

2 Claims. (Cl. 214—17)

This invention relates to apparatus for automatically controlling the flow of flour or the like to a bin by means of which the level of material in the bin may be maintained nearly constant while the material is withdrawn from the bottom at regular or irregular intervals.

In a flour mill a single conveyor may carry flour to any one of a number of spouts, each leading to a flour bin which may be two, three or even four floors below the conveyor. Each of these spouts has a valve for controlling the flow of flour in that spout. Where the spout is very long and fills completely with flour, withdrawal of flour from the bin below will sometimes cause a vacuum to occur in the center of the spout due to the flour "hanging up" in the upper portion. This vacuum may even cause the spout to collapse.

An object of this invention is to provide a valve and means for automatically operating it which will insure a feed of flour as needed to maintain a given level in the bin and one which will prevent flour from filling much of the spout, thereby precluding the possibility of the flour hanging up in the spout.

Another object is the provision of means for automatically maintaining a nearly constant depth of flour in a bin so that the flour delivered to a hopper beneath from which bags are filled, will have a nearly uniform density. This is necessary for uniform weights in bags when filling and weighing are done automatically.

These and other objects, as will hereinafter appear, are described in the following specification and shown in the accompanying drawings in which Figure 1 is a partial vertical section through a bin and the spout leading thereto, showing the valve closed and the mechanism for automatically controlling it;

Fig. 2 is a similar view showing the valve open;

Fig. 3 is a perspective showing the valve and operating mechanism;

Fig. 4 is a partial longitudinal section on the line 4—4 of Fig. 3;

Fig. 5 is a partial section on the broken line 5—5 of Fig. 4;

Fig. 6 is a partial perspective of the far end of the operating shaft of Fig. 3.

Figure 1:
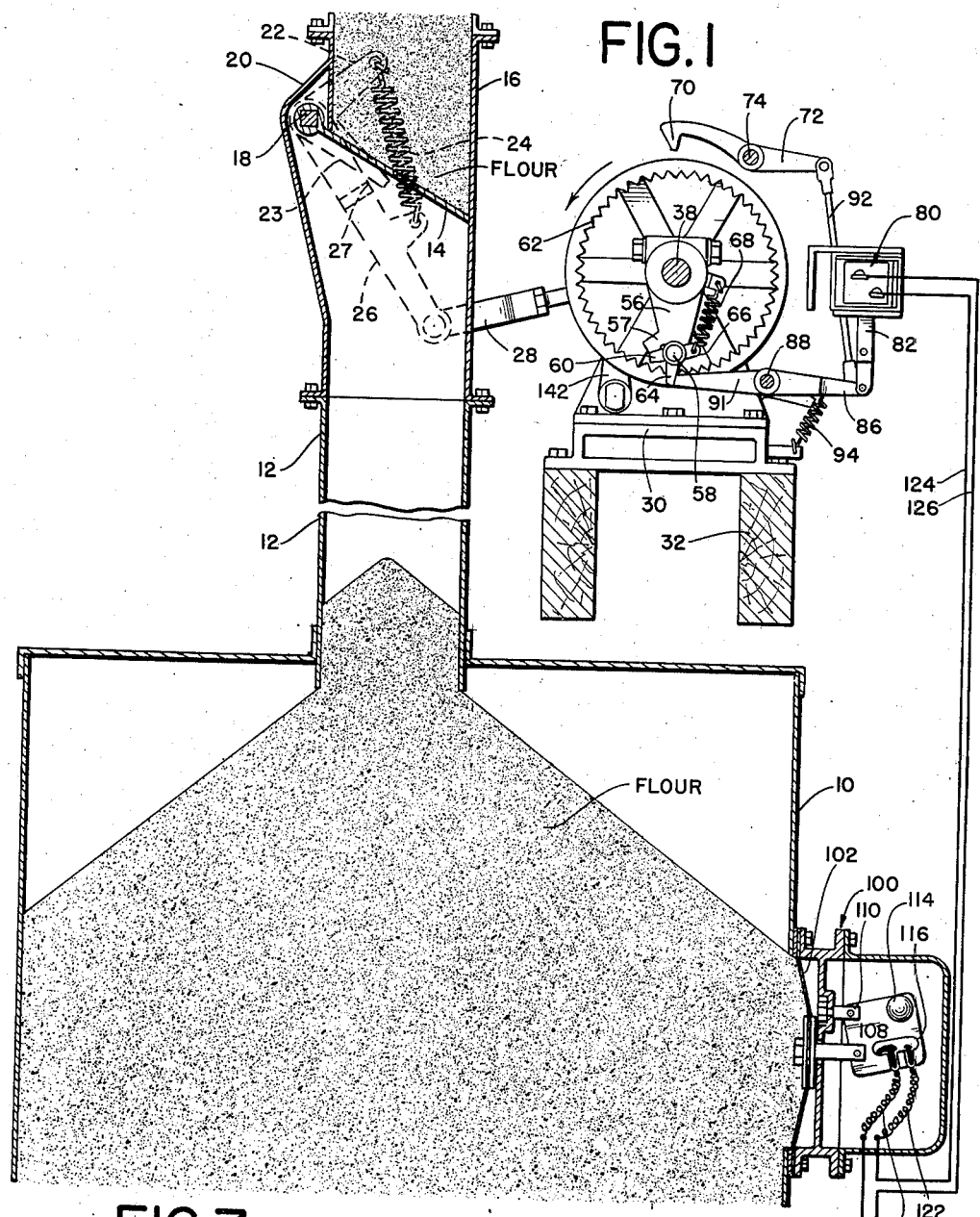
Figure 7:
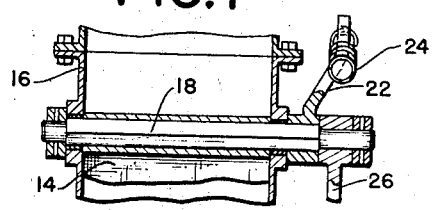
Fig. 7 is a partial vertical section through the valve shaft of Fig. 1.

The embodiment as illustrated comprises a bin 10 having a spout 12 leading thereto from a point perhaps one, two or three floors above and fed by a conveyor, not shown, which however feeds several spouts and bins of which only one is shown.

A flat-type valve 14 is located in the valve housing 16 forming part of the spout and is secured on a squared shaft 18 which is suitably journaled in the sides of the housing 16 at one side of the spout proper and is located in a recess 20 at one side so as to permit it to turn down out of the path of any flour which may be passing through the spout as shown in Fig. 2.

An operating lever 22 is secured to the shaft and is yieldingly connected through a spring 24 with an operating lever 26 which is pivotally carried on a reduced and rounded portion of the shaft 18. A crank arm 23 is carried by the lever 22 which is normally held in engagement with a stop 27 on the operating lever 26 by means of the tension spring 24. This operating arm is moved back and forth by means of a connecting rod 28 which is driven by a mechanism which will now be described.

A base 30 for the operating mechanism is carried on suitable joists or the like 32. To this are bolted support members 34, 36 in which are formed suitable bearings for a shaft 38 (Fig. 4). A flange 40 is secured on this shaft and has adjustably bolted thereon a crank arm 42 which carries a pin 44 to which is connected the outer end of the connecting rod 28.

A ratchet wheel 50 is secured to a sleeve 52 which is rotatably mounted on the shaft 38, the sleeve carrying a sprocket 54 which is driven continuously by a chain by any suitable source of power, not shown.

The shaft 38 has firmly secured thereon a lever 56 which carries a stop 57 and a short transverse stud 58 which is suitably journaled therein and which carries a pawl 60 which is adapted to engage any of the teeth 62 of the ratchet wheel 50. The pawl 60 also carries a finger 64 and an arm 66, the latter being urged in a counter-clockwise direction, as shown in Fig. 6, by means of a tension spring 68. The stop 57 limits the swing of the pawl 64.

A detent 70 for the finger 64 at the top of its swing which is normally out of the path of the finger 64, as shown in Fig. 1, is carried on a lever 72 which is pivotally mounted on a pin 74 which in turn is mounted on an extension support member 36 (Fig. 6). This support member also carries a solenoid 80 which has a core 82 connected through links 84 to a lever arm 86 which is pivotally mounted at 88 on the support 36. One branch of this lever arm 90 connects through a link 92 with the lever 72 while another branch 91 serves as a detent for the finger 64 at the bottom of its swing as shown in Fig. 1. A spring 94 normally holds the detents 70 and 91 in the position shown in Fig. 1 with the flap valve 14 closed so that should the main conveyor which feeds flour or the like to the spout 12 be started, it will not fill up the entire length of the spout which in itself may cause trouble as will later be seen.

The mechanism for operating the solenoid 80 will now be described. A pressure-controlled indicator 100 is located near the top of the bin and has a suitable flexible diaphragm 102 of canvas and the like to which is secured a disk 104 which in turn carries a rod 106 which is pivotally connected to a plate 108, the latter being pivotally mounted at 110 to a member 112 which serves also to support the periphery of the diaphragm 102. The plate 108 is provided with a weight 114 and carries a mercury switch 116 to the terminals of which are secured electric leads 120 and 122. These are secured through leads 124, 126 to the terminals of the solenoid 80 to a suitable source of electric current 128 which may be either direct or alternating.

From the foregoing it will be seen that with the bin 10 filled, as shown in Fig. 1, the diaphragm 102 is pressed outwardly by the flour thereby opening the mercury switch 116, de-energizing the solenoid 80, and enabling the spring 94 to raise the detent 91 in the path of the finger 64, at the same time raising the detent 70 so as to release the finger 64 from the position in which we find it in Fig. 2. Upon release of the finger 64 by the pawl 70 the spring 68 causes the pawl 60 to rotate in a counter-clockwise direction about the stud 58 so as to bring it into engagement with one of the teeth of the ratchet wheel 50 which is continuously rotating and which carries the arm 56 around with it until the finger 64 strikes the detent 91 (Fig. 1). During this time the valve 14, which was held open as shown in Fig. 2 so long as the finger 64 was held by the detent 70, is now moved to closed position as shown in Fig. 1.

To assist in disengaging the pawl 60 from the teeth of the ratchet wheel, I have provided a cam 130 which is adjustably secured by means of bolts 132 to a flange 134 which is keyed on the shaft 38. This cam, which can be seen most clearly in Fig. 5, has two arcuate portions terminating in abrupt shoulders 136, either of which may be engaged by a cam follower roller 138 rotatably mounted on a pin 140 carried by a lever arm 142 which is drawn by a spring 144 so that the roller 138 is urged against the face of the cam 130.

Thus it will be seen that by properly adjusting the cam 130, it will urge the finger 64 forwardly into either of the detents 70 or 91 at the instant this finger strikes either of the detents, thereby causing the pawl 60 to become disengaged from the teeth of the sprocket wheel.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. In combination, a bin, a spout leading to the bin, a valve in the spout for controlling the flow of granular material through the spout, means operable by material in the bin for closing the valve when the material in the bin reaches a predetermined level, and means operable for opening the valve when the level of material in the bin reaches a lower predetermined level, said means including spring means whereby the valve is yieldable on opening when the space in the spout below the valve is filled with granular material.

2. In combination, a bin, a spout leading to the bin, a valve in the spout for controlling the flow of granular material through the spout, a lever operably connected to the valve for opening and closing the same, a constantly revolving ratchet wheel, an arm operably connected to the lever and rotatable about the axis of the ratchet wheel, a spring-pressed pawl carried by the arm and adapted to be forced by the spring into engagement with the ratchet wheel, a finger carried by the pawl, detents for stopping the finger in positions about one-half revolution apart corresponding to open and closed positions of the valve, means for moving the pawl forward more rapidly than the ratchet wheel as the finger engages the detent to cause the pawl to release, and means operable by the level of material in the bin for moving said detents into the path of said finger.

HELMER ANDERSON.